(12) United States Patent
Cobb

(10) Patent No.: US 9,855,578 B2
(45) Date of Patent: Jan. 2, 2018

(54) CO-EXTRUSION PRINT HEAD WITH EDGE BEAD REDUCTION

(71) Applicant: Palo Alto Research Center Incorporated, Palo Alto, CA (US)

(72) Inventor: Corie Lynn Cobb, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 923 days.

(21) Appl. No.: 14/104,173

(22) Filed: Dec. 12, 2013

(65) Prior Publication Data

US 2015/0165469 A1 Jun. 18, 2015

(51) Int. Cl.
| | | |
|---|---|---|
| *B41J 2/14* | (2006.01) | |
| *B05C 5/02* | (2006.01) | |
| *B29C 47/00* | (2006.01) | |
| *B29C 47/06* | (2006.01) | |
| *B29C 47/14* | (2006.01) | |
| *B29C 47/70* | (2006.01) | |
| *B29C 47/30* | (2006.01) | |
| *B29C 47/08* | (2006.01) | |

(52) U.S. Cl.
CPC .......... *B05C 5/027* (2013.01); *B29C 47/0021* (2013.01); *B29C 47/0069* (2013.01); *B29C 47/062* (2013.01); *B29C 47/145* (2013.01); *B29C 47/30* (2013.01); *B29C 47/707* (2013.01); *B29C 47/0837* (2013.01); *B29C 2947/92152* (2013.01); *B29C 2947/92447* (2013.01); *B29C 2947/92647* (2013.01); *B29C 2947/92942* (2013.01); *Y10T 29/49401* (2015.01)

(58) Field of Classification Search
CPC ............................ B41J 2/1433; B41J 2/14201
See application file for complete search history.

(56) References Cited

U.S. PATENT DOCUMENTS

| | | | |
|---|---|---|---|
| 3,694,132 A | 9/1972 | Bunte | |
| 3,797,987 A | 3/1974 | Marion | |
| 4,348,346 A | 9/1982 | Thompson | |
| 5,398,372 A | 3/1995 | Kush | |
| 6,409,316 B1 * | 6/2002 | Clark | B41J 2/1604 347/63 |
| 8,117,983 B2 | 2/2012 | Fork et al. | |
| 2010/0143581 A1* | 6/2010 | Eldershaw | B41J 2/005 427/75 |
| 2013/0020737 A1 | 1/2013 | Ulcej | |
| 2014/0186698 A1* | 7/2014 | Cobb | H01M 4/0402 429/209 |

FOREIGN PATENT DOCUMENTS

EP 0490294 A1 6/1992

* cited by examiner

*Primary Examiner* — Jason Uhlenhake
(74) *Attorney, Agent, or Firm* — Marger Johnson

(57) ABSTRACT

A co-extrusion print head has at least one channel, and a set of orifices fluidically connected to the channel, wherein the set of orifices has at least one orifice at each edge of the set has a smaller vertical extent than the other orifices.

14 Claims, 6 Drawing Sheets

CO-EXTRUSION PRINT HEAD WITH EDGE BEAD REDUCTION

BACKGROUND

Co-extrusion print heads allow two or more materials to be extruded simultaneously onto a substrate. These materials often consist of slurries, liquids loaded with particles. Examples of co-extrusion print heads and their applications can be found in U.S. Pat. Nos. 7,799,371; 8,117,983; and 7,780,812; as well as US Patent Publication Nos. 20100505 and 20121539. Some applications use highly-loaded slurries, such as for battery electrode manufacture. The extrusion process of these slurries, especially the highly-loaded slurries, sometimes causes the formation of an edge bead, shown in FIGS. 1 and 2.

FIG. 1 shows a monolithic thin film formed of one material 10 having an edge bead 12. FIG. 2 shows a thin film formed of at least two materials 14 and 16, having an edge bead 18. However, for most films a variation of less than 2% in thickness is desired. Typically, some sort of mechanical or chemical post processing is performed that removes the edge beads. This can add to the overall processing time or hardware complexity.

Some of the approaches used to eliminate edge beads include feeding extra polymer into the extrusion process to provide a controllable edge, which can then be cut away after drawing the film from the die, as in U.S. Pat. No. 4,348,346. Another approach uses compressed gas to push down on the sides to force the edge beads down, as shown in U.S. Pat. No. 5,398,372. Another approach uses a deckle, or fence, to control the edge bead, as in U.S. Pat. Nos. 3,797,987 and 3,694,132. A similar approach is shown in US Publication No. 20130020737 with an edge sculpting mechanism.

DETAILED DESCRIPTION OF THE EMBODIMENTS

Figure 1:
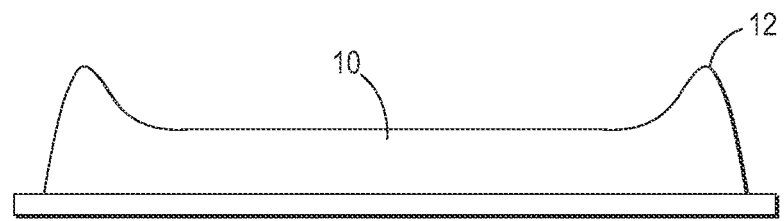
FIGS. 1 and 2 show examples of edge beads in extruded materials.

As mentioned above, FIGS. 1 and 2 show materials printed or deposited by a co-extrusion print head. The materials typically take the form of slurries of liquids with particles suspended in them. These materials have many different applications and uses. One particular application for which these printed materials seem suited are battery components. The co-extrusion print head may extrude one material or more. Typically, when the print head extrudes more than one material, it typically extrudes them in alternating stripes. FIG. 3 shows an embodiment of such a co-extrusion print head.

The print head 20 of FIG. 3 consists of at least two plates. The term 'plate' as used here could be a plate, a sheet or any other form of material that can be stacked to form the print head. The print head has an exit channel 24 on the bottom plate 30. The exit channel is fed by at least one or more of the channels 26. Each port 32 feeds each individual channel such as 28. The upper plate of the print head 20 may have multiple ports 22. The material feeds into the ports and through the channels 26 to the final channel 24 out of the print head 30 to end up on the substrate as a print. One should note that this is merely one example of a co-extrusion print head and the embodiments here may apply to many different kinds of print heads.

Figure 4:
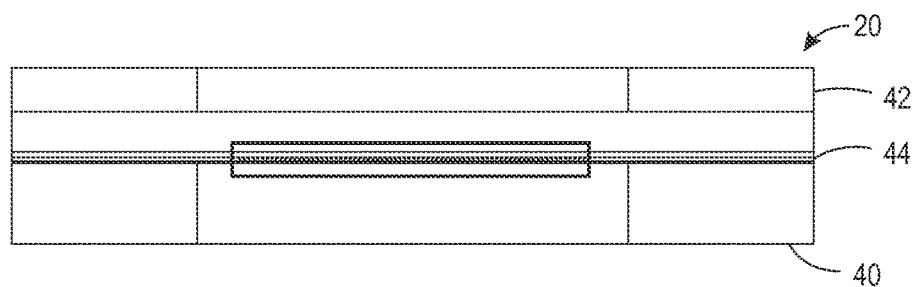
FIGS. 4-6 show end-on views of an embodiment of a co-extrusion head.
Figure 5:
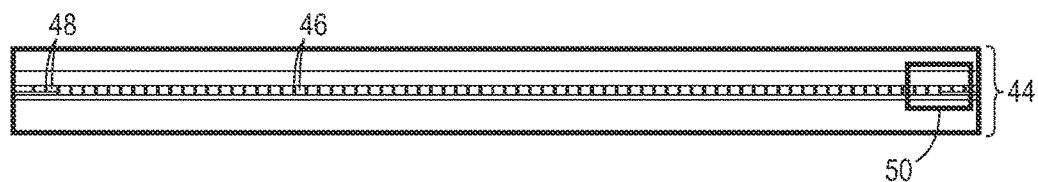
Figure 6:
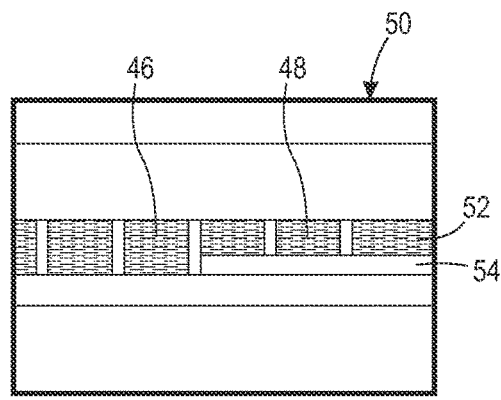

FIGS. 4-6 show views of a co-extrusion print head 20 as seen from an end-on view. In FIG. 4, the embodiment of the print head has a bottom or fixture plate 40. At least one plate 44 has a set of orifices that allow the material or materials to exit the print head 20. The print head of FIG. 4 may also have a top plate 42.

FIG. 5 shows a more detailed view of the set of orifices from the middle plate 44. Most of the orifices in the set of orifices, such as 46, have a particular vertical extent. However, at least one of the orifices such at 48 at each edge of the set of orifices has a vertical extent smaller than the others. FIG. 6 shows a close-up view of the edge orifices of the set shown as the subset 50.

In FIG. 6, the subset of orifices show the orifices such as 46 that have a 'full' vertical extent, and in this embodiment, there are two other orifices such as 48 that have a smaller or shorter vertical extent. The term 'vertical' used here is relative to the orientation of the print head view in FIGS. 4-6. One should note that the use of the term 'vertical' is not intended to limit the application of the embodiments and no such limitation should be assumed.

In FIG. 6, the orifices are formed from two plates. The first plate 52 has a full set of orifices such as 48. The orifices on the plate 52 are approximately half the vertical extent of the resulting orifices such as 46. The plate 54 has a second set of orifices having fewer orifices than the first set. The orifices in these two plates align, where the alignment results in at least one orifice from the first set being blocked because the second plate does not have orifices in the locations of the orifices such as 48. More than two plates may be used, with each successive plate having fewer orifices than the previous plate. Alternatively, the shorter orifices may result from one plate having a set of orifices that are all of the same size, but something covers part of the orifices having the smaller extent at the exit, or the channels back to where the material enters the channel is filled or otherwise blocked. This may be a small piece or film mounted to the exit surface of the plate.

Figure 7:
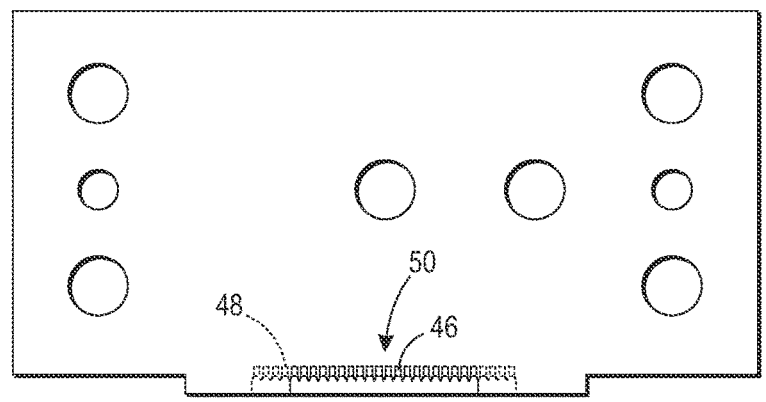
FIGS. 7 and 8 show top-down views of an embodiment of two orifice plates used in a co-extrusion head.
Figure 8:
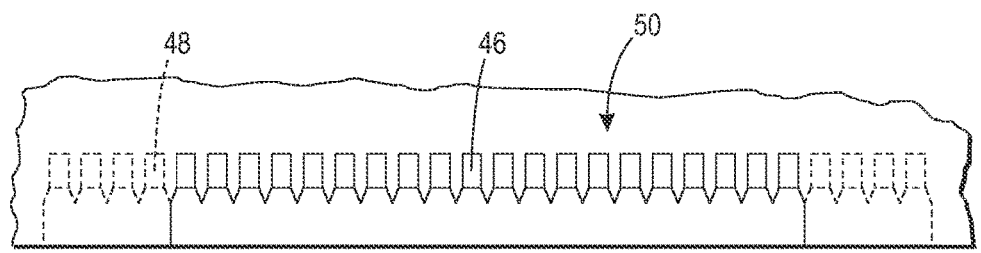

FIG. 7 shows a top view of orifice plates in a print head such as 20 of FIG. 4 showing the set of channels, with FIG. 8 showing the top view of 52 and 54. In FIG. 8, 4 channels on each edge match up to the orifices 48 that have a smaller extent than the other orifices such as 46. There is no limitation to any particular number of smaller orifices at each edge. In addition, there is no limitation as to whether the smaller orifices are aligned with the bottom of the other orifices or with the tops of the other orifices. As shown in FIGS. 4-6, the shorter orifices are aligned with the tops of the other orifices. Because FIGS. 7 and 8 only show the orifice plates 52 and 54, the channels do not reveal the fluid path that would be 'under' them in this view. The plate 54 lies on top of plate 52, with the dashed lines showing the nozzles hidden under plate 54.

Figure 9:
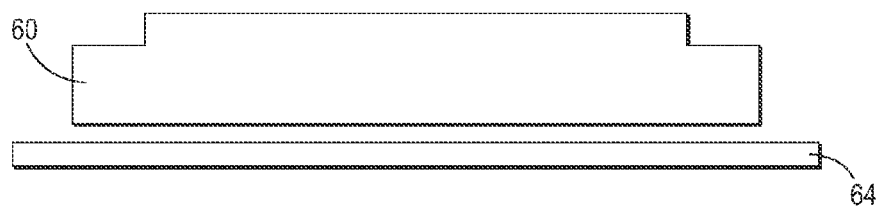
FIGS. 9 and 10 show possible orientations of the stair-stepped exit nozzle geometry relative to a target substrate.
Figure 10:
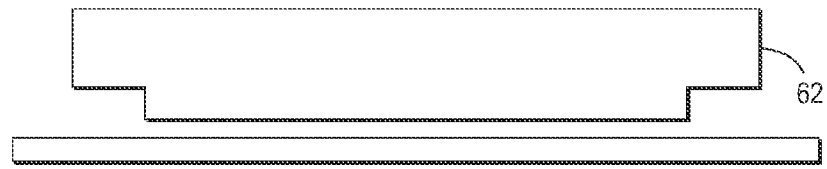

This alignment results in a stair-stepped configuration of the orifices as shown in FIG. 9, with the set of orifices having fewer orifices being on top of the other orifice set. The 'top' of the stack is farthest from the print substrate 64. FIG. 10 shows an alternative configuration, 62, where the smaller set of orifices are on the bottom, where the bottom of the stack is closest to the print substrate.

Figure 2:
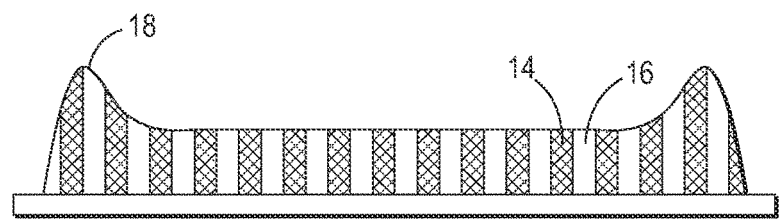
Figure 3:
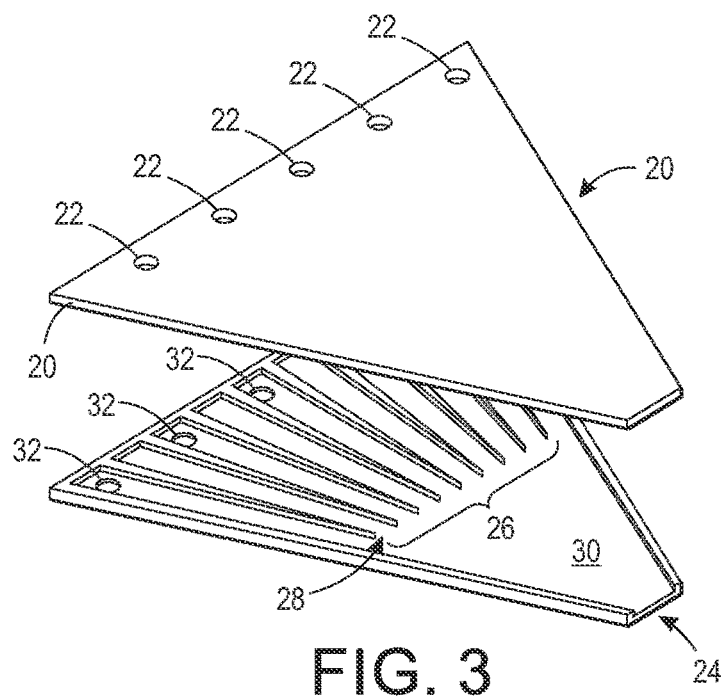
FIG. 3 shows an embodiment of a co-extrusion head.
Figure 11:
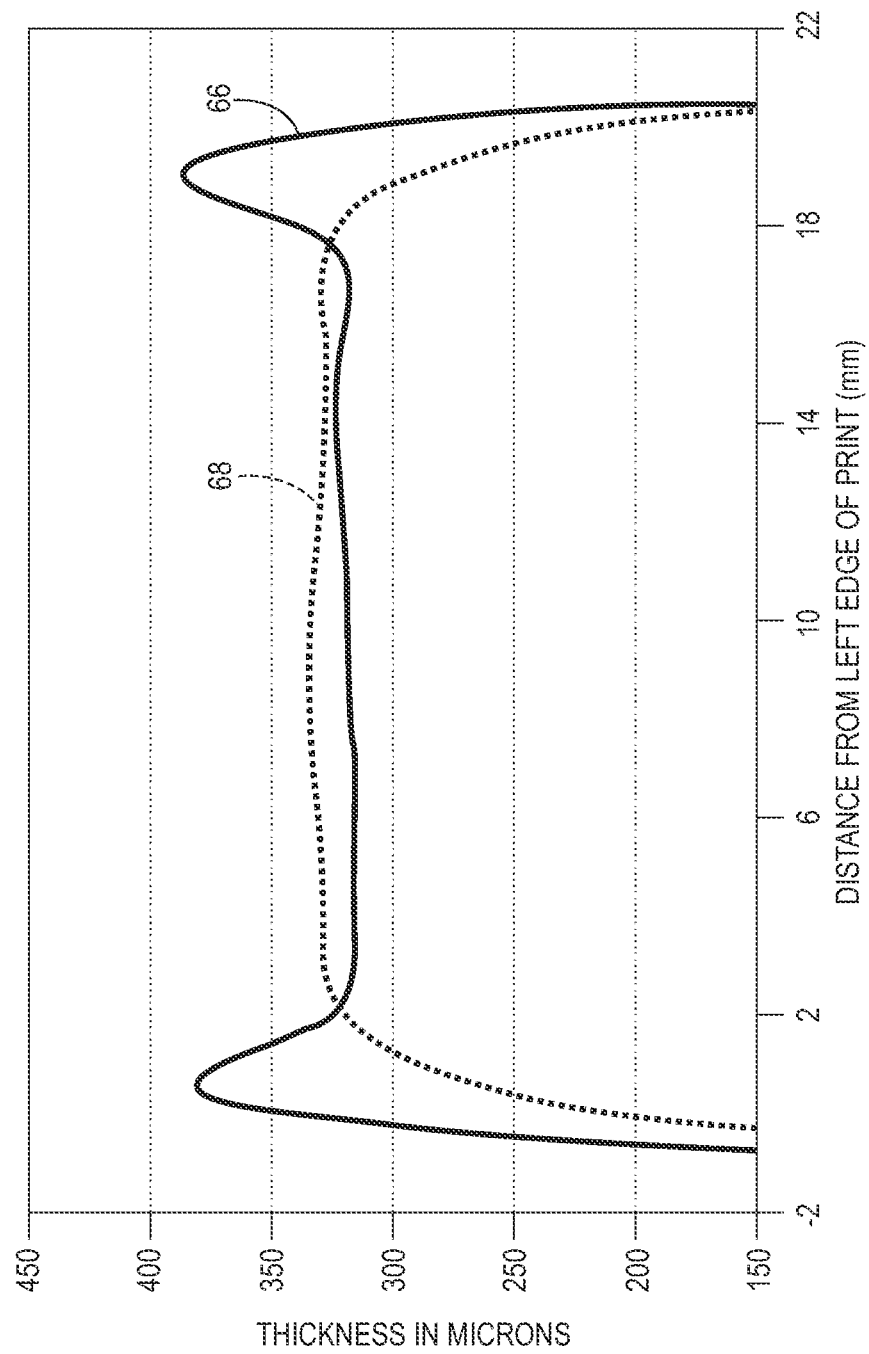
FIG. 11 shows a comparison of surface profiles of co-extrusion prints.

The resulting prints or extrusions from a print head having a stair-stepped configuration do not have edge beads, or if they do have an edge bead, it will be much smaller than previous implementations as were shown in FIGS. 1 and 2. FIG. 11 shows a graphical representation of the thickness of the material measured at varying distances from the left edge of a sample print. The line 66 represents a sample printed from a non-stair-stepped print head. Line 68 shows the data for a print from a stair-stepped print head. As can be seen by this, the stair-stepped print head results in prints that do not have edge beads.

Figure 12:
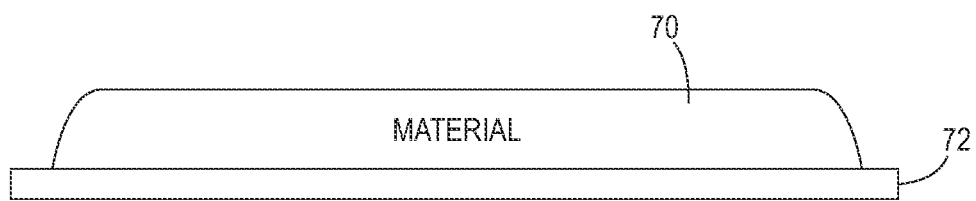
FIGS. 12 and 13 show embodiments of printed materials using a stair-stepped co-extruded print head.
Figure 13:
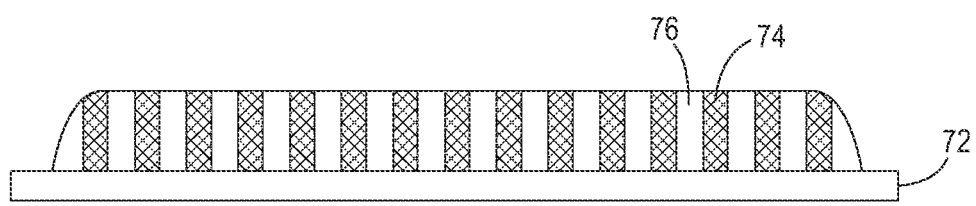

For comparison purposes, FIGS. 12 and 13 show similar profiles of prints as those in FIGS. 1 and 2. In FIG. 12, the material 70 is extruded onto a substrate 72 with a noticeably absent edge bead. In FIG. 13, the print shows alternating materials 76 and 74 on substrate 72, also with no edge bead.

In this manner, a co-extrusion, stair-stepped print head can produce printed materials that have the desired flatness with no edge bead. The stair steps can be achieved by manufacturing plates with fewer orifices in one or more layers, or can result from inserting some sort of material to partially block the edge orifices on currently existing print heads. One should note that the partial block may need to run the entire horizontal extent of the channel up to the shorter orifices, as otherwise issues with material build up may result.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A co-extrusion print head, comprising:
   at least one channel;
   a set of orifices fluidically connected to the channel, wherein the set of orifices has at least one orifice at each edge of the set has a smaller vertical extent than the other orifices, wherein the set of orifices comprise a set of openings in at least two plates and the two plates comprise a first plate having a first set of sub-orifices of a predetermined number and a second plate having a second set of sub-orifices of a number less than the predetermined number, wherein the second set of sub-orifices has fewer sub-orifices than the predetermined number.

2. The co-extrusion print head of claim 1, wherein the at least one orifice comprises one of one orifice, two orifices or four orifices.

3. The co-extrusion print head of claim 1, further comprising a fixture plate arranged underneath the set of orifices.

4. The co-extrusion print head of claim 1, further comprising a top plate residing on top of the set of orifices.

5. The co-extrusion print head of claim 1, wherein the at least one orifice having the smaller vertical extent aligns with a top of the other orifices in the set of orifices.

6. The co-extrusion print head of claim 1, wherein the at least one orifice having the smaller vertical extent aligns with the bottom of the other orifices in the set of orifices.

7. The co-extrusion print head of claim 1, further comprising a third set of orifices, the third set of orifices having fewer sub-orifices than the second set of orifices.

8. The co-extrusion print head of claim 1, further comprising a block on the at least one orifice at each edge with a smaller vertical extent.

9. A co-extrusion print head comprising:
   a first plate having a first set of orifices; and
   a second plate having a second set of orifices, wherein the second set of orifices has fewer orifices than the first plate, the first plate and second plate stacked to align the orifices resulting in at least one orifice at each edge of the print head having a smaller vertical extent than other orifices.

10. The co-extrusion print head of claim 9, further comprising a fixture plate upon which the first and second plates are arranged.

11. The co-extrusion print head of claim 9, further comprising a top plate on top of the first and second plates.

12. The co-extrusion print head of claim 9, wherein the first plate is arranged below the second plate.

13. The co-extrusion print head of claim 9, wherein the first plate is arranged above the second plate.

14. The co-extrusion print head of claim 9, further comprising a third plate having a third set of orifices.

* * * * *